United States Patent [19]

Kelly

[11] Patent Number: 5,580,195

[45] Date of Patent: Dec. 3, 1996

[54] MACHINING KIT AND METHOD OF USING THE SAME

[76] Inventor: Henry L. Kelly, 1966 Rio Salado Pkwy., Tempe, Ariz. 85281

[21] Appl. No.: 364,818

[22] Filed: Dec. 27, 1994

[51] Int. Cl.$^6$ .............................. B23B 41/12; B23B 45/14
[52] U.S. Cl. ..................... 408/115 R; 408/1 R; 408/227; 408/708
[58] Field of Search ................................. 408/72 R, 72 B, 408/79, 80, 1 R, 115 R, 115 B, 199, 227, 707–709, 201; 144/136 R, 136 C, 218, 219, 231, 233, 240; 407/30, 53

[56] References Cited

U.S. PATENT DOCUMENTS

| | | | |
|---|---|---|---|
| 1,580,934 | 4/1986 | McCormick | 408/227 |
| 2,911,019 | 11/1959 | Bailey, Jr. et al. | 144/218 |
| 3,228,438 | 1/1966 | Serry | 144/218 |
| 4,039,011 | 8/1977 | Sword | 144/218 |
| 4,451,186 | 5/1984 | Payne | 408/115 R |
| 4,720,219 | 1/1988 | Masonek et al. | 408/201 |
| 4,871,285 | 10/1989 | Moore | 408/115 R |
| 4,975,001 | 12/1990 | Rabo et al. | 408/201 |

*Primary Examiner*—Steven C. Bishop
*Attorney, Agent, or Firm*—Harry M. Weiss; Jeffrey D. Moy; Harry M. Weiss & Associates, P.C.

[57] ABSTRACT

A kit for reaming the governor bores of used motor vehicle transmissions includes several cutting tools having cutting heads of different diameter. The diameters of the cutting heads are matched to the differing diameters of the governor bores of different transmissions. Each of the cutting heads is generally flat and has two pairs of flat parallel edge faces. The edge faces of the two pairs are normal to but do not intersect one another. Cutting tips project outward from the zones between neighboring edge faces. The kit further includes a guide for the cutting tools, and the guide has a centering element as well as several pairs of holes. The holes of different pairs have differing relative positions which correspond to the differing relative positions of threaded holes in the different transmissions. This allows the guide to be connected to any of the transmissions. The kit also includes several adapters each of which is provided with first and second centering elements. The first centering elements are the same for all adapters and are complementary to the centering element of the guide. The second centering elements of the adapters differ from one another and are complementary to differing centering elements of the different transmissions. Each of the adapters is provided with a pair of holes having the same relative position as the threaded holes of the corresponding transmission.

27 Claims, 2 Drawing Sheets

5,580,195

MACHINING KIT AND METHOD OF USING THE SAME

BACKGROUND OF THE INVENTION

1. Field of the Invention

The invention relates to the machining of objects.

2. Description of the Related Art

Automotive transmissions contain a bearing which is inserted in a so-called governor bore. As a transmission ages, leaks tend to develop around the bearing thereby affecting the performance of the transmission.

Since replacement of a transmission is costly, it has become the practice to rework a leaking transmission. Thus, the bearing is removed and the governor bore smoothed by means of a cutting tool. A new bearing is then inserted in the governor bore.

The cutting tool consists of a cutting head mounted on one end of a shaft. To align the cutting tool with the governor bore, a tool holder or guide is secured to the transmission. The guide has a passage which registers with the governor bore and receives the shaft of the cutting tool.

The transmission and the guide are provided with complementary centering portions which serve to center the guide with respect to the transmission. The transmission further has a pair of threaded holes, and the guide has a matching pair of holes which are brought into alignment with the holes in the transmission when the guide is to be secured to the transmission. The guide is connected to the transmission by screws or bolts which are inserted in the holes.

Automotive transmissions come in a wide variety of designs and the threaded holes in different transmissions have different relative positions. Moreover, the centering portions of different transmissions differ from one another. Consequently, a large stock of guides must be kept on hand. This is costly inasmuch as the guides are expensive. Also, the guides are relatively bulky and take up a large amount of space.

In addition to the drawbacks associated with the guides, the cutting tools available today are not entirely satisfactory for the reworking of governor bores.

SUMMARY OF THE INVENTION

It is an object of the invention to allow a reduction in the number of tool guides required for the machining of different designed articles.

Another object of the invention is to provide a machining tool which permits the reworking of bores, as well as other machining operations, to be improved.

The preceding objects, and others which will become apparent as the description proceeds, are achieved by the invention.

One aspect of the invention resides in a machining kit. The kit comprises a guide for a machining tool, and the guide is provided with first guide connecting means and second guide connecting means. The kit further comprises a first adapter for adapting the guide to the first objects to be machined, and the first adapter has first adapter connecting means capable of being aligned with the first guide connecting means, but not the second guide connecting means. The kit also comprises a second adapter for adapting the guide to the second objects to be machined, and the second adapter has second adapter connecting means capable of being aligned with the second guide connecting means, but not the first guide connecting means.

The different connecting means on the guide, in conjunction with the different adapters, makes it possible to secure the guide to differently designed objects. Accordingly, the guide of the invention can serve as a guide for a plurality of prior art guides. Although the invention substitutes adapters for guides, the adapters need not perform a guiding function. Hence, the adapters can be less expensive and less bulky than guides thereby allowing costs to be reduced and space savings to be achieved.

Another aspect of the invention resides in a method of operating on a first object and a differently designed second object. The method comprises the steps of connecting a guide to the first object, machining the first object with a tool guided by the guide, and disconnecting the guide and the first object from one another. The method additionally comprises the steps of adapting the guide to the second object, connecting the guide to the second object, and machining the second object with a tool guided by the guide. The first and second objects can, for instance, comprise automotive transmissions.

The step of connecting the guide to the first object may include aligning a pair of first holes in the guide with a pair of holes in the first object. Similarly, the step of connecting the guide to the second object may include aligning a pair of second holes in the guide with a pair of holes in the second object.

The adapting step can involve covering the first holes.

The first object may have a first centering portion and the second object a differently designed second centering portion. The method can then further comprise the step of centering the guide with respect to the first object via an additional centering portion complementary to the first centering portion. The adapting step here includes replacing the additional centering portion with another centering portion complementary to the second centering portion.

The machining steps may involve the enlargement of preexisting openings in the first and second objects.

An additional aspect of the invention resides in a machining tool. The machining tool comprises a plate-like machining head provided with a pair of substantially flat and parallel first edge faces, and a pair of substantially flat and parallel second edge faces which are unparallel to the first edge faces. The first edge faces and the second edge faces are nonintersecting so that a zone of separation is defined between each of the first edge faces and each of the second edge faces. The machining head is further provided with a plurality of machining tips which project outward of the first and second edge faces from respective ones of the separation zones.

During machining of an object, gaps are formed between the machining head and the object due to the flat edge faces and projecting tips of the machining head. This enables more effective machining to be achieved.

Additional features and advantages of the invention will be apparent from the following detailed description of preferred embodiments when read in conjunction with the accompanying drawings.

DESCRIPTION OF THE PREFERRED EMBODIMENTS

Figure 1:
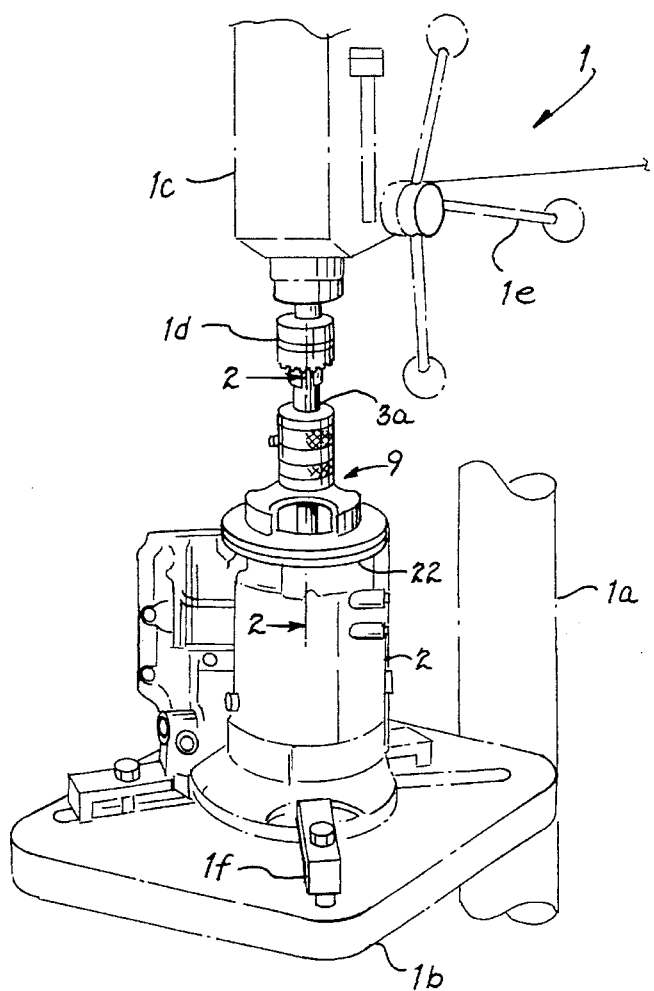
FIG. 1 is a perspective view illustrating the cutting of a bore in a drill press using components of a machining kit according to the invention.

With reference to FIG. 1, the numeral 1 generally identifies a conventional drill press. The drill press 1 includes a column 1a which supports a table 1b and a drill press head 1c. The drill press head 1c carries a chuck 1d and a handwheel 1e for moving the chuck 1d up-and-down.

Figure 2:
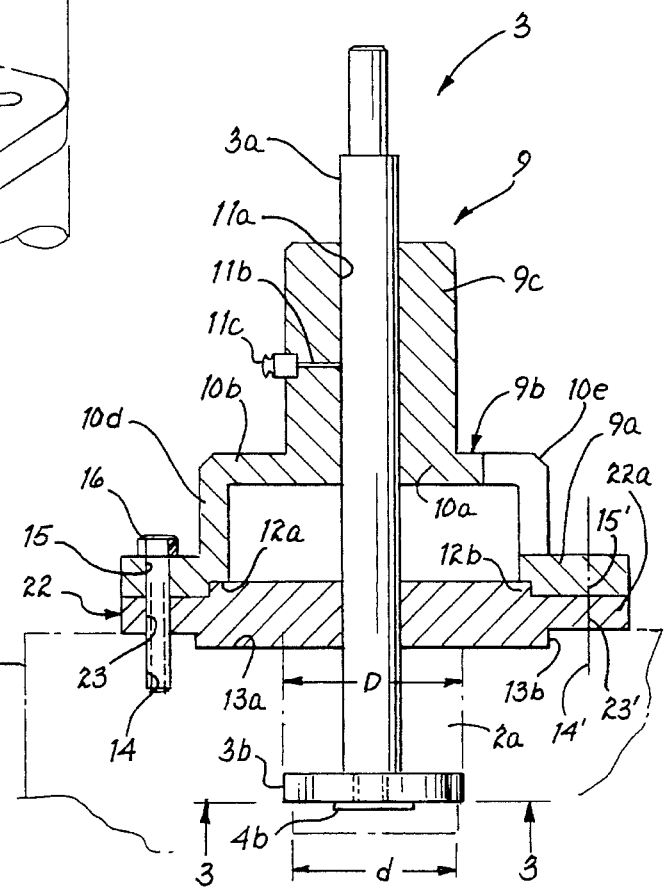
FIG. 2 is a sectional view per the arrows 2—2 in FIG. 1.

In FIG. 1, an object 2 to be machined is secured to the table 1b by means of several clamps 1f which are spaced from one another circumferentially of the table 1b. The object 2 is a used automotive transmission which began to leak around a bearing mounted in a governor bore of the transmission 2. The bearing has been removed and the governor bore is to be reamed in the drill press 1 preparatory to insertion of a new bearing in the governor bore. FIG. 2 shows a portion of the transmission 2 in phantom lines, and the governor bore is indicated at 2a.

Figure 3:
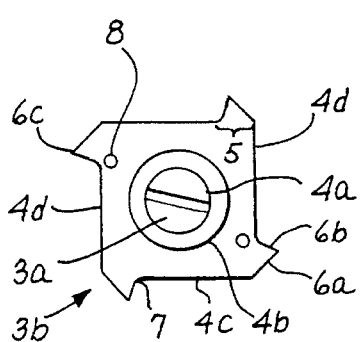
FIG. 3 is a view, per the arrows 3—3 in FIG. 2, of a machining head constituting part of the machining kit in accordance with the invention.
Figure 4:
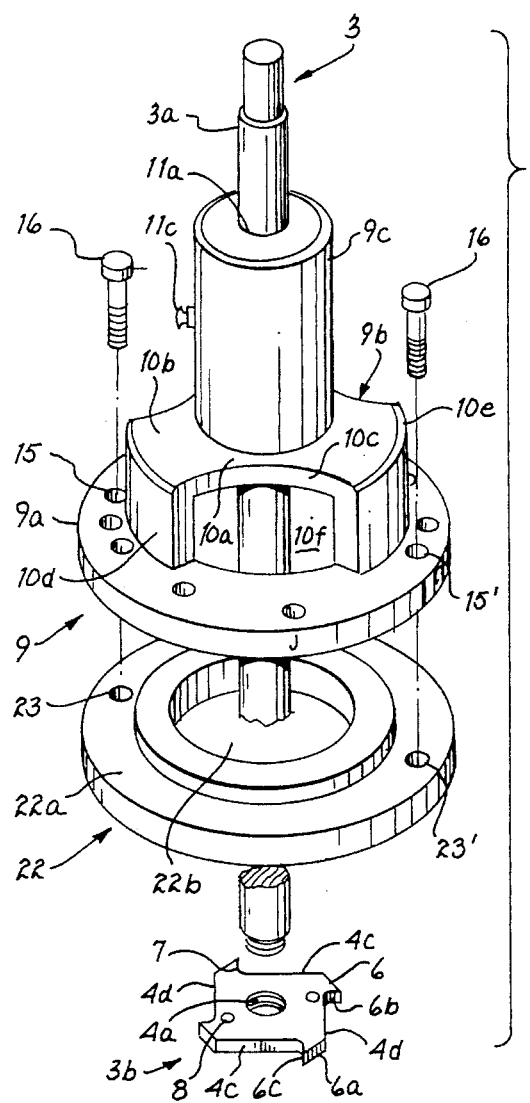
FIG. 4 is an exploded view illustrating the manner of assembling a set of components from the machining kit according to the invention.

Considering FIGS. 3 and 4 in conjunction with FIGS. 1 and 2, the governor bore 2a is to be reamed by means of a cutting or machining tool 3 constituting part of a machining kit according to the invention. The machining tool 3 includes a shaft 3a of circular cross section which carries a cutting or machining head 3b at one end thereof. The other end of the shaft 3a is locked in the chuck 1d.

The cutting head 3b consists of an integral plate or plate-like element having a central opening 4a. The opening 4a is circular, and the axis of the opening 4a constitutes an axis of rotation for the cutting head 3b. As seen in FIG. 4, the end of the shaft 3a which carries the cutting head 3b is provided with external threads. The opening 4a is provided with complementary internal threads so that the cutting head 3b can be screwed onto and unscrewed from the shaft 3a. An annular projection 4b surrounds the opening 4a on the bottom of the cutting head 3b.

Referring to FIGS. 3 and 4, the cutting head 3b has a pair of flat, parallel edge faces or surfaces 4c and a pair of flat, parallel edge faces or surfaces 4d. The plate constituting the cutting head 3b defines a plane and the edge faces 4c,4d are normal to such plane. Furthermore, the edge faces 4c are normal to the edge faces 4d.

The edge faces 4c alternate with the edge faces 4d circumferentially of the cutting head 3b so that each of the edge faces 4c is flanked circumferentially by the two edge faces 4d, and vice versa. However, the edge faces 4c do not intersect the edge faces 4d and each edge face 4c is separated from the neighboring edge faces 4d by a zone 5.

A cutting or machining tip 6 projects from each of the separation zones 5 to a location outward of the edge faces 4c,4d. Each of the cutting tips 6 is bounded by a flat surface or surface portion 6a and a flat surface or surface portion 6b.

Like the edge faces 4c,4d, the flat surfaces 6a, 6b are normal to the plane of the cutting head 3b. The flat surfaces 6a intersect the adjacent edge faces 4c or 4d while the flat surfaces 6b merge into the adjoining edge faces 4c or 4d via radii 7.

The flat surfaces 6a,6b of each cutting tip 6 are inclined with respect to one another and intersect outward of the edge faces 4c,4d to form a cutting or machining edge 6c. The flat surfaces 6a,6b are also inclined relative to the respective edge faces 4c,4d. However, the inclinations of the flat surfaces 6a differ from the inclinations of the flat surfaces 6b. Thus, the flat surfaces 6a define relatively large obtuse angles with the edge faces 4c,4d intersected thereby, whereas the flat surfaces 6b define relatively small obtuse angles with the edge faces 4c,4d into which they merge.

Each of the cutting tips 6 is disposed diametrically opposite another of the cutting tips 6. The cutting head 3b is provided with a pair of diametrically opposed through holes 8 which are located in the regions of respective diametrically opposed cutting tips 6 adjacent the corresponding radii 7.

FIG. 2 shows that the reaming of the governor bore 2a involves an enlargement of the bore 2a from an original diameter d to a final diameter D.

The machining kit of the invention further comprises a tool guide or tool support 9 which serves to align the cutting tool 3 with respect to the governor bore 2a and to guide the cutting tool 3 during reaming of the governor bore 2a. Considering FIGS. 1, 2, 4 and 5, the tool guide 9 includes an annular, plate-like flange or member 9a, and a plate-like platform 9b which is spaced from and centered relative to the flange 9a. The platform 9b consists of a hub or central section 10a, and three spokes or arms 10b which radiate from the hub 10a. The platform 9b has three concavities which are formed by three concave, part-circular surfaces 10c extending along the sides of the hub 10a and the spokes 10b.

The flange 9a and the platform 9b define respective planes which are parallel to one another. The platform 9b is mounted on the flange 9a by way of three legs 10d which project from the outer ends of the spokes 10b normal to the planes of the flange 9a and the platform 9b. Bevels 10e are provided on the platform 9b at the intersections of the legs 10d and the spokes 10b. The legs 10d are spaced from one another circumferentially of the flange 9a and the platform 9b. Due to the concavities in the platform 9b and the gaps between the legs 10d, three cutouts 10f are formed in the tool guide 9. Each of the cutouts 10f is located intermediate two neighboring legs 10d.

The outer ends of the spokes 10b extend along respective arcs of a common circle. Similarly, each of the legs 10d is part-cylindrical, and the three legs 10d all constitute part of a common cylinder.

A cylinder or cylindrical member 9c is located on the side of the platform 9b facing away from the legs 10d. The cylinder 9c is mounted on the hub 10a and is centered with respect to the platform 9b and the flange 9a. A central guide passage 11a of circular cross section runs longitudinally of the cylinder 9c and extends through the hub 10a. The flange 9a has a central circular opening which is in register with the guide passage 11a and has a diameter larger than that of the cutting head 3b. The guide passage 11a, on the other hand, has a smaller diameter than the cutting head 3b and is dimensioned to receive the shaft 3a of the cutting tool 3 with a small amount of play so that the cutting tool 3 can rotate relative to the tool guide 9 while being guided thereby.

A lubricating passage 11b extends radially from the outer peripheral surface of the cylinder 9c to the guide passage 11a. The lubricating passage 11b is closed by a set screw 11c.

An annular recess 12a is formed in the side of the flange 9a facing away from the legs 10d. The recess 12a constitutes a centering element or centering portion of the tool guide 9. The transmission 2 is likewise provided with an annular recess 13a constituting a centering element or centering portion of the transmission 2.

The transmission 2 is further provided with a pair of threaded holes 14 and 14'. The flange 9a of the tool guide 9 has a matching pair of holes 15 and 15' which can be brought into register with the holes 14,14' when the flange 9a is placed on the transmission 2 as shown in FIGS. 1 and 2. The holes 14,14' and 15,15' allow the tool guide 9 and the transmission 2 to be connected to one another by means of threaded fasteners 16 such as bolts or screws. The holes 14,14' constitute a connecting means of the transmission 2 while the holes 15,15' constitute a connecting means of the tool guide 9. When the holes 14,14' are in register with the holes 15,15', the tool guide 9 and the cutting tool 3 are centered with reference to the transmission 2 and the governor bore 2a.

The transmission 2 represents but one of many different types of transmissions to be reworked in the drill press 1. Each type of transmission has its own design and the centering elements of different types of transmissions differ from one another. Similarly, the connecting holes in one type of transmission have a different relative position than the connecting holes in another type of transmission.

Figure 5:
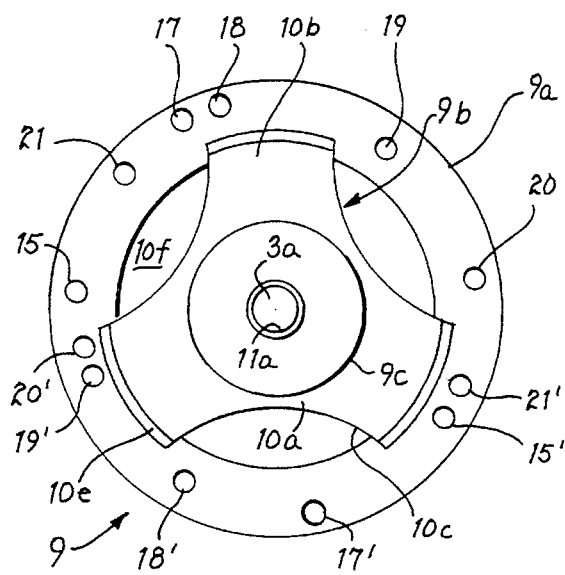
FIG. 5 is a top view of a tool guide constituting part of the machining kit in accordance with the invention.

Since the tool guide 9 is relatively expensive and relatively bulky, it is desirable to use the tool guide 9 for more than one type of transmission in order to reduce cost and storage space. To this end, the flange 9a of the tool guide 9 is provided with several pairs of holes in addition to the connecting holes 15,15'. In FIG. 5, the additional pairs of holes are identified by 17,17'; 18,18'; 19,19'; 20, 20'; and 21,21'. The relative position of the holes of each hole pair 14,14'; 17,17'; 18,18'; 19,19'; 20,20'; 21,21' differs from that of the holes of any other hole pair and each of the hole pairs 14,14'; 17,17'; 18,18'; 19,19'; 20,20'; 21,21' can be aligned with a pair of threaded holes in a different type of transmission. Like the hole pair 14,14', the hole pairs 17,17'; 18,18'; 19,19'; 20,20'; 21,21' respectively constitute connecting means of the tool guide 9.

As mentioned above, different types of transmissions have different centering elements. Consequently, the centering recess 12a of the tool guide 9 is able to cooperate with the centering elements of only a very limited number of transmissions, if any.

To facilitate centering of the tool guide 9 with respect to transmissions whose centering elements are not complementary to the centering recess 12a, the machining kit of the invention is provided with a plurality of adapters. One of the adapters is illustrated in FIGS. 1, 2, 4 and 6 and is denoted by the numeral 22.

The adapter 22 is an annular plate-like member which includes an annular rim or ring 22a. The rim 22a surrounds a central circular opening 22b of larger diameter than the cutting head 3b of the cutting tool 3. The rim 22a is provided with a pair of holes 23,23' having the same relative position as the threaded holes 14,14' of the transmission 2 and the connecting holes 15,15' of the tool guide 9. Hence, the adapter holes 23,23' can be brought into register with the threaded transmission holes 14,14' and the tool guide connecting holes 15,15'.

As seen in FIGS. 2 and 4, one side of the adapter 22 has an annular projection 12b which encircles the central opening 22b and is located radially inward of the adapter holes 23,23'. The projection 12b is complementary to the centering recess 12a of the tool guide 9 and constitutes a centering element or centering portion of the adapter 22.

Figure 6:
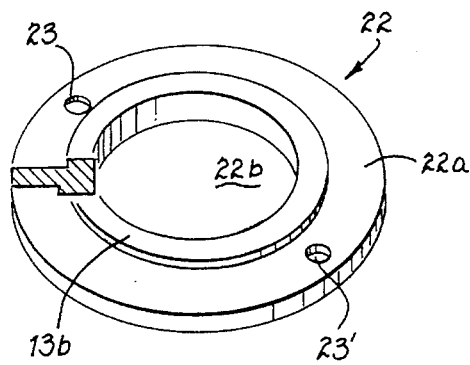
FIG. 6 is a bottom view of an adapter constituting part of the machining kit according to the invention.

FIGS. 2 and 6 illustrate that the side of the adapter 22 opposite the projection 12b is provided with an annular projection 13b which encircles the central opening 22b and is disposed radially inward of the adapter holes 23,23'. The projection 13b is complementary to the centering recess 13a of the transmission 2 and constitutes a centering element or centering portion of the adapter 22.

The annular centering recess 12a of the tool guide 9 can be replaced by an annular centering projection. The annular centering projection 12b of the adapter 22 will then be replaced by an annular centering recess.

The remaining adapters of the machining kit differ from the adapter 22 primarily in the relative position of the adapter holes and in the design of the transmission centering element, i.e., the configuration and/or dimensions of the centering element which cooperates with the transmission being reworked.

Figure 7:
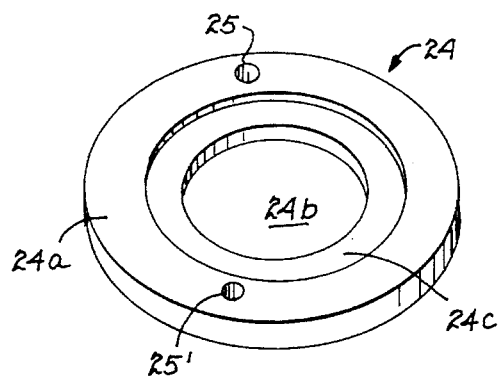
FIG. 7 is a bottom view of another adapter constituting part of the machining kit in accordance with the invention.

By way of example, FIG. 7 shows another adapter 24 from the machining kit of the invention. The adapter 24 is again an annular plate-like member which includes an annular rim or ring 24a surrounding a central circular opening 24b. The rim 24a is provided with a pair of holes 25,25' which have a different relative position than the adapter holes 23,23' of the adapter 22 and the same relative position as one of the pairs of connecting holes 17,17'; 18,18'; 19,19'; 20,20'; 21,21' of the tool guide 9.

The side of the adapter 24 not visible in FIG. 7 has an annular projection which encircles the central opening 24b and is located radially inward of the adapter holes 25,25'. This projection, which is identical to the annular centering projection 12b of the adapter 22, is complementary to the centering recess 12a of the tool guide 9 and constitutes a centering element or centering portion of the adapter 24.

The side of the adapter 24 shown in FIG. 7 is provided with an annular recess 24c which encircles the central opening 24b and is disposed radially inward of the adapter holes 25,25'. The projection 24c, which constitutes a centering element or centering portion of the adapter 24, is complementary to an annular projection forming a centering element or centering portion of a different type of transmission than the transmission 2.

To facilitate selection of an adapter, the adapters are preferably color coded. It is further possible to provide the edge of each adapter rim and the edge of the tool guide flange 9a with alignment marks. When the alignment marks on an adapter are in register with the alignment marks on the tool guide 9, the adapter holes line up with the corresponding connecting holes 15,15'; 17,17'; 18,18'; 19,19'; 20,20'; or 21,21' of the tool guide 9.

The governor bores of different types of transmissions have different diameters. The machining kit of the invention accordingly includes cutting heads of different diameter, that is, cutting heads which differ in the distance between diametrically opposed cutting edges. The cutting heads provided in addition to the cutting head 3b can be identical to the latter except for their dimensions. Each of the cutting heads is preferably provided with its own shaft.

The operation of the machining kit of the invention will be described assuming that the transmission 2 has just arrived at a machining facility containing the drill press 1. It is further assumed that the transmission 2 requires reworking due to leakage around a bearing in the governor bore 2a.

The bearing is removed from the governor bore 2a by conventional means and the transmission 2 is stood on end on the drill press table 1b with the governor bore 2a facing up. This is shown in FIGS. 1 and 2.

The tool guide 9, the cutting tool 3 and the adapter 22 are selected from the machining kit and, together with the transmission 2, are cleaned if necessary. The shaft 3a of the cutting tool 3 is inserted in the guide passage 11a of the tool guide 9 so that the cutting head 3b is on the same side of the cylinder 9c as the flange 9a. The adapter 22 is positioned with the centering projection 13b for the transmission 2 facing down and the centering projection 12b for the tool guide 9 facing up.

The tool guide 9 is placed on the adapter 22 in such a manner that the centering projection 12b of the adapter 22 is received in the centering recess 12a of the tool guide 9. The flange 9a of the tool guide 9 rests on the rim 22a of the adapter 22. The tool guide 9 and the adapter 22 are now rotated relative to one another in order to bring the tool guide connecting holes 15,15' into register with the adapter holes 23,23'. This procedure is facilitated if the tool guide 9 and the adapter 22 are provided with alignment marks.

The assembly of the tool guide 9, the cutting tool 3 and the adapter 22 is placed on the upward facing end of the transmission 2 so that the centering projection 13b of the adapter 22 is received in the centering recess 13a of the transmission 2. The tool guide 9 and the adapter 22 are then rotated as a unit until the registering holes 15,15' and 23,23' are in alignment with the threaded holes 14,14' of the transmission 2. Thereafter, the fasteners 16 are screwed into the holes 14,14' to connect the tool guide 9 and the adapter 22 to the transmission 2.

Once the tool guide 9 and the adapter 22 have been secured to the transmission 2, the transmission 2 is shifted on the drill press table 1b to bring the shaft 3a of the cutting tool 3 into register with the chuck 1d. The shaft 3a is thereupon locked in the chuck 1d and the drill press clamps 1f adjusted and tightened to fix the transmission 2 on the drill press table 1b.

The drill press 1 is now started and the governor bore 2a reamed by advancing the cutting head 3b into the bore 2a by means of the handwheel 1e.

Upon completion of the reaming operation, the cutting head 3b is retracted from the governor bore 2a and the shaft 3a of the cutting tool 3 released from the chuck 1d. The fasteners 16 are loosened and the tool guide 9, the cutting tool 3 and the adapter 22 removed from the transmission 2.

If now a different type of transmission is to be reworked, the adapter 22 and the cutting tool 3 are placed back in the machining kit. An adapter and a cutting tool appropriate for the new transmission are selected and the shaft of the new cutting tool is inserted in the guide passage 9a of the tool guide 9. Following the procedure outlined above, the tool guide 9 is then connected to the new transmission by way of the new adapter and the governor bore of the new transmission reamed using the new cutting tool. The tool guide 9, the new cutting tool and the new adapter are subsequently removed from the new transmission.

The machining kit of the invention eliminates the need for a separate tool guide for each type of transmission. Instead, a single tool guide with a series of adapters serves several types of transmissions. The replacement of tool guides with adapters makes it possible to reduce costs and storage space since the adapters can be less expensive and less bulky than tool guides.

Furthermore, the cutting head design of the invention enables more effective machining to be achieved. This is due to the flat edge faces and projecting tips of the cutting heads which result in gaps between the cutting heads and objects being machined.

Various modifications are possible within the meaning and range of equivalence of the appended claims.

What is claimed is:

1. A machining kit, particularly for use with automotive transmissions, comprising, in combination:
    a guide for a machining tool, said guide having first guide connecting means and second guide connecting means;
    a first adapter for adapting said guide to first objects to be machined, said first adapter having first adapter connecting means capable of being aligned with said first guide connecting means but not said second guide connecting means; and
    a second adapter for adapting said guide to second objects to be machined, said second adapter having second adapter connecting means capable of being aligned with said second guide connecting means but not said first guide connecting means.

2. The kit of claim 1 wherein each of said connecting means comprises a pair of holes.

3. The kit of claim 1 wherein said guide comprises a platform having a first side and a second side, a substantially cylindrical member projecting from said first side and defining a guide passage for a machining tool, a plurality of legs projecting from said second side and having respective ends remote from said second side, and a substantially annular member connecting said ends to one another and defining an opening in register with said guide passage.

4. The kit of claim 3 wherein said first guide connecting means and said second guide connecting means are provided on said annular member.

5. The kit of claim 3 wherein said annular member is plate-like.

6. The kit of claim 1 wherein each of said adapters is provided with an adapter centering portion for centering the respective adapter with respect to an object to be machined.

7. The kit of claim 6 wherein said adapter centering portions comprise protrusions or recesses.

8. The kit of claim 7 wherein said protrusions and said recesses are substantially annular.

9. The kit of claim 6 wherein said adapter centering portions differ from one another.

10. The kit of claim 6 wherein each of said adapters is provided with an additional centering portion, said guide being provided with a guide centering portion which is complementary to said additional centering portions so as to permit centering of said guide with respect to said adapters.

11. The kit of claim 10 wherein said guide centering portion comprises a protrusion and said additional centering portions comprise recesses, or said guide centering portion comprises a recess and said additional centering portions comprise protrusions.

12. The kit of claim 1 wherein said adapters are plate-like.

13. The kit of claim 1 wherein said adapters are substantially annular.

14. The kit of claim 1 wherein said adapters are color coded.

15. The kit of claim 1 further comprising at least two machining tools of different size.

16. The kit of claim 1 further comprising a machining tool having a shaft and a machining head for said shaft, said guide being provided with a guide passage for said shaft.

17. The kit of claim 1 further comprising a machining tool having a plate-like machining head, said machining head including a pair of substantially flat and parallel first edge faces, and a pair of substantially flat and parallel second edge faces which are unparallel to said first edge faces, said first edge faces and said second edge faces being nonintersecting so that a zone of separation is defined between each of said first edge faces and each of said second edge faces, and said machining head further including a plurality of machining tips which project outward of said edge faces from respective ones of said zones.

18. The kit of claim 17 wherein said first edge faces are substantially normal to said second edge faces.

19. The kit of claim 17 wherein said machining head defines a plane and said edge faces are substantially normal to said plane.

20. The kit of claim 17 wherein each of said machining tips is at least partially bounded by a first surface which defines an obtuse angle with the respective first edge face and a second surface which defines an obtuse angle with the respective second edge face.

21. The kit of claim 20 wherein said machining head defines a plane and said surfaces are substantially flat and normal to said plane.

22. The kit of claim 20 wherein each of said first surfaces intersects the respective first edge face and each of said second surfaces is separated from the respective second edge face by a radius.

23. The kit of claim 20 wherein each of said first surfaces defines a first obtuse angle with the respective first edge face and each of said second surfaces defines a smaller second obtuse angle with the respective second edge face.

24. The kit of claim 17 wherein a machining tip projects from each of said zones.

25. The kit of claim 17 wherein said machining head is integral.

26. A method of operating on a first object and a differently designed second object, said method comprising the steps of:

connecting a guide to said first object;

machining said first object with a tool guided by said guide;

disconnecting said guide and said first object from one another;

adapting said guide to said second object;

connecting said guide to said second object; and machining said second object with a tool guided by said guide, said first object has a first centering portion and said second object has a differently designed second centering portion; and further comprising the step of centering said guide with respect to said first object via an additional centering portion complementary to said first centering portion, the adapting step including replacing said additional centering portion with another centering portion complementary to said second centering portion.

27. The method of claim 26, wherein the machining steps comprise enlarging preexisting openings in said first object and said second object.

* * * * *